Oct. 13, 1959 W. R. WALKER 2,908,385
METHOD OF LUBRICATING A PIERCED EXTRUSION BILLET
Original Filed Feb. 26, 1954 2 Sheets-Sheet 1
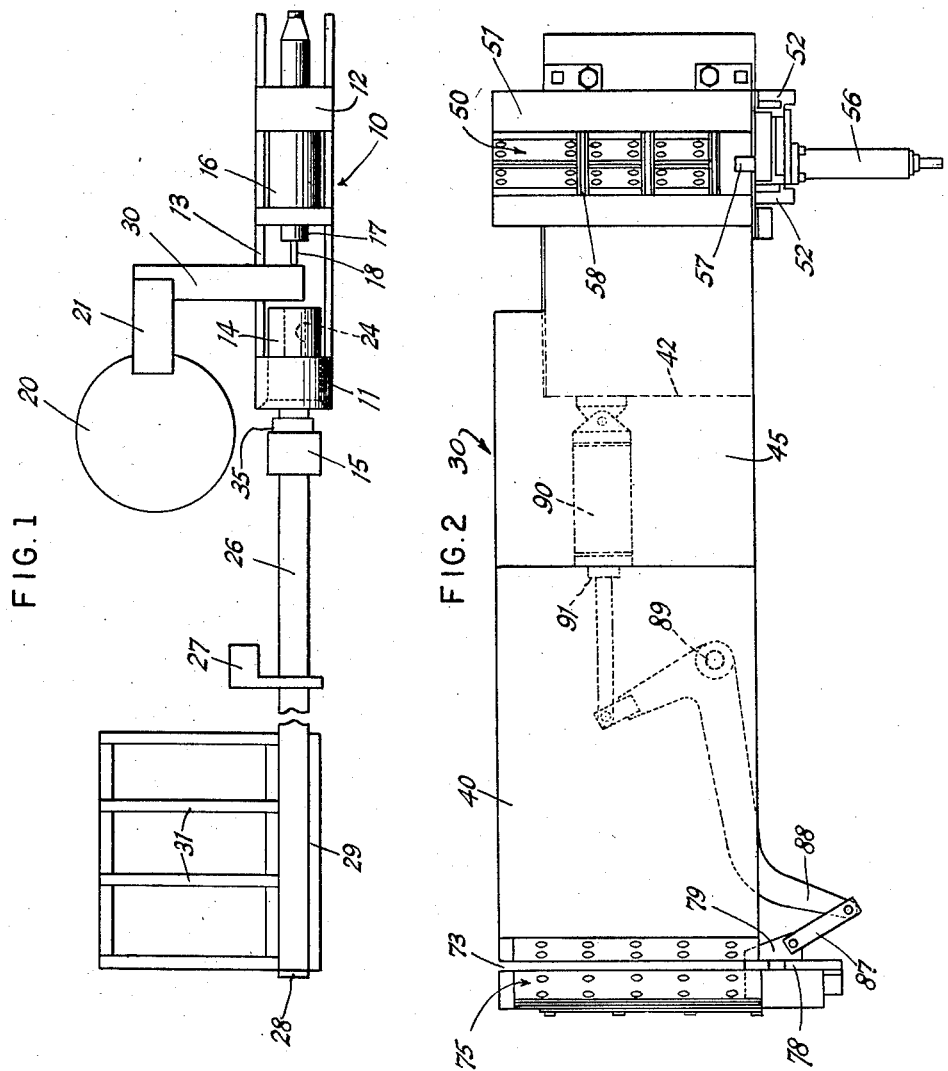
INVENTOR
William R. Walker
BY
*[signature]*
ATTORNEY INVENTOR
William R. Walker
BY
*signature*
ATTORNEY United States Patent Office 2,908,385
Patented Oct. 13, 1959

2,908,385

METHOD OF LUBRICATING A PIERCED EXTRUSION BILLET

William R. Walker, New Brighton, Pa., assignor to The Babcock & Wilcox Company, New York, N.Y., a corporation of New Jersey Continuation of application Serial No. 412,687, February 26, 1954. This application March 5, 1958, Serial No. 719,277

2 Claims. (Cl. 207—10)

This invention relates to a novel method of applying a relatively refractory lubricant to the inner surface of a pierced billet to be extruded as a tubular shape. This application is a continuation of my copending application Serial No. 412,687, filed February 26, 1954, for "Method of Internally Lubricating a Pierced Extrusion Billet," now abandoned.

In the formation of metal shapes by extrusion, a block or billet of metal at an elevated temperature is forced under high pressure to flow through a die having an opening corresponding to the desired cross-sectional shape of the extrusion to be produced. The temperature of the metal may be 2300° F., in the case of steel, by way of example.

To form a tubular extrusion, the billet is usually pierced before insertion in the extrusion press and, before ram pressure is applied to the billet, a mandrel is projected coaxially through the billet and die. When pressure is applied to the billet, the billet metal flows through the die around the mandrel, so that a tube is extruded having dimensions determined by the die and the mandrel. In effect, the die and mandrel cooperate to form an annular extrusion orifice opening.

In a typical extrusion press, a front and rear platen are held in accurately spaced relation with each other. Between the platens is mounted a billet container for movement toward and away from the forward platen. The rear platen supports a ram arranged to project into the container and force a billet therein to flow through the die. The latter is mounted in a die holder releasably engaged in a die carrier aligned with the container passage. This carrier is mounted for movement into and out of the forward platen to move the die into and out of operative relation with the exit or downstream end of the container.

When an extrusion is to be made, the container is moved forwardly to seat against the rear face of the forward platen. A die holder and die assembly is meanwhile mounted on the rear face of the carrier and the latter is moved rearwardly into the forward platen to engage the die in a recess in the forward end of the container and coaxial with the container passage. The carrier is then locked to the forward platen. After a heated billet has been loaded into the container, the ram, carrying a dummy block on its outer end, is moved forwardly under very high pressure to force the billet outwardly through the die. The extrusion is then severed and conveyed away from the press.

The formation of metal shapes by extrusion has been successfully applied to non-ferrous metals for some time. However, it is only recently that plain and alloy steels have been extruded by using glass as a lubricant. This has been due to the relative difficulties and problems involved in the extrusion of steels and alloys as compared to the difficulties and problems of extruding non-ferrous metals such as aluminum, brass, and copper. For example, the use of lubricants having a carbon base for the extrusion of some alloy steels may require an excessive amount of refinishing of the extruded shape due to the carbon pickup in the hot metal. These extra finishing operations have prevented the extrusion process from attaining a competitive position with respect to other metal working processes.

This picture has been changed radically by the introduction of a new steel extrusion process in which relatively refractory materials, such as glass, have been used as lubricants. These refractory materials have the advantage that they do not contain any significant amounts of carbon as a constituent element, coupled with a further advantage that the glass has the property of melting in successive layers or films as it is contacted by the hot metal. Thus, only the surface or contacting layer of the glass is initially melted as the billet moves therealong, and as this film is destroyed, successive underlying layers or films are melting sequentially, thus providing a continuous lubricant film between the extrusion and the die through which the extrusion is being forced under very high pressures.

In the aforementioned typical extrusion press, plugs of glass fiber or similar material are placed in the container passage before the billet is loaded into the container. Charging of the billet into the container pushes these plugs up against the upstream or entry surface of the die. In addition, a layer of glass lubricant is applied to the external surface of the hot billet as the latter is being fed to the extrusion press. This may be effected by wrapping a sheet of glass fiber around the billet surface as the heated billet rolls over a transfer surface toward the press, or by rolling the hot billet over a bed of powdered glass.

The surface of the internal passage in the pierced billet is lubricated presently by placing a "sock" of glass fiber on the outer end of the mandrel before the latter is projected through the billet and die. The glass of this "sock" progressively melts as the billet is extruded outwardly over the mandrel through the die.

The overall thickness of the woven glass fiber sock or sleeve is substantially in excess of the average thickness of the glass film formed on the surface of the billet passage and of the die as a result of melting of the glass fiber sleeve or sock.

To provide the necessary clearance for projection of the sleeve covered mandrel through the billet and die without binding, the passage diameter must be greater than the mandrel diameter by at least the overall thickness of the glass sleeve or sock. The difference between the passage inside diameter and the mandrel outside diameter could be substantially reduced if the clearance required were only that necessary for the thickness for the glass film distributed uniformly over the surface of the billet and die passages.

Reduction of the passage diameter to a value closely approaching that of the mandrel diameter has a vital effect on the quality of tubular extrusions, particularly on the concentricity of the inside and outside diameters of the extrusions. The smaller the clearance between the mandrel and the inside passage of the billet, the better the concentricity of the extruded tubular elements. This improvement in concentricity probably results from some action which occurs during the collapse of the billet when extrusion pressure is initially applied. No matter what its cause, the improvement in concentricity due to reduction of such clearance is very significant and has been adequately demonstrated in extrusion operations.

To this end, the invention is directed to a novel method of providing a uniformly thick layer of refractory lubricant on the interior surface of a heated tubular billet before the latter is loaded into the extrusion press container. The uniform depth of this film is carefully controlled so that it provides substantially exactly the right amount of lubricant for each extrusion, the depth being determined from such factors as the temperature and composition of the billet and its length and internal diameter.

A preferred way of providing this uniformly thick lubricating layer is to roll the billet over a transfer surface or means on its way from the heating bath or furnace to the extrusion press. A measured quantity of solid glass, such as a wad of glass fiber, woven or loose, is inserted into the billet passage as the latter starts to roll over the transfer surface on its way to the press. The high heat of the billet melts the glass in contact with the hot internal surface of the billet as the billet rolls over the transfer surface, so that the glass forms a uniform layer of lubricant uniformly distributed over the surface of the passage in the billet.

With the glass lubricant already applied to the internal surface of the billet before the latter is charged into the press, the mandrel does not have to be fitted with a sleeve or sock of glass fiber. Consequently, the size of the hole formed in the billet can be reduced by substantially the difference between the overall thickness of the glass sleeve and the thickness of the glass film on the billet internal surface. The reduction results in closer clearance between billet and mandrel with resulting improvement in concentricity. The operation is also speeded as no delay is required for fitting of the sleeve onto the mandrel. A further saving results from the ability to use glass in a very inexpensive form.

For an understanding of the invention principles, reference is made to the following description of a typical embodiment thereof as illustrated in the accompanying drawings.

In the drawings:

Fig. 1 is a schematic plan view of an extrusion press and associated billet and extrusion handling and processing components;

Fig. 2 is a plan view of transfer means for conveying a billet from a billet heating means to the extrusion press.

Figure 3:
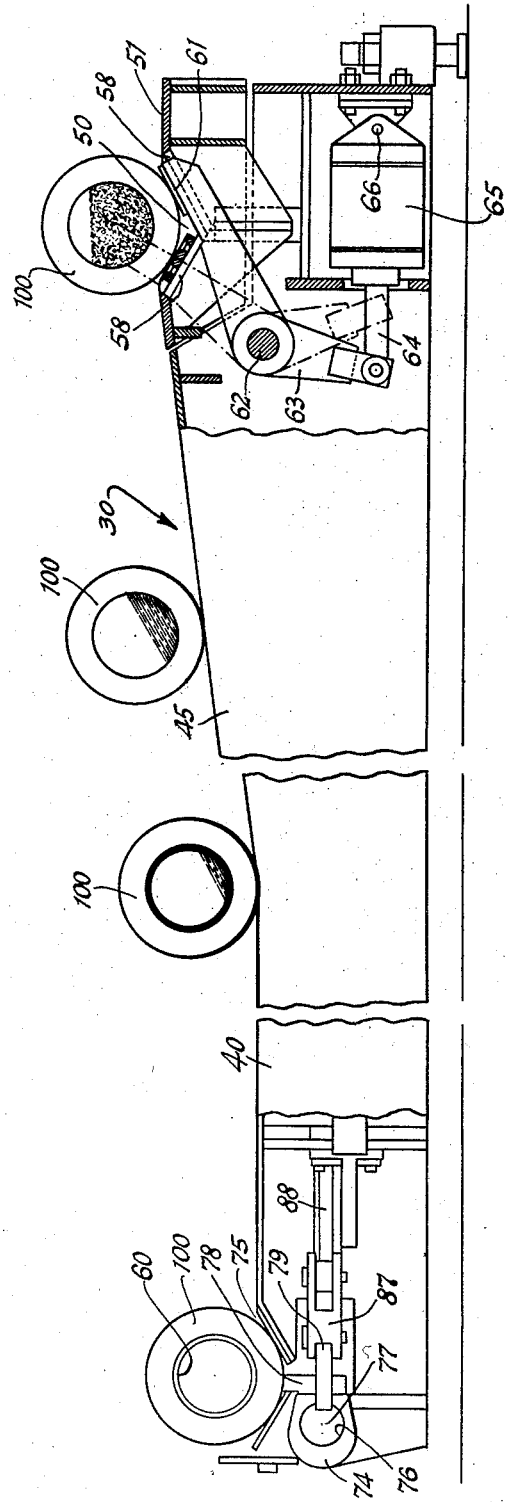
Fig. 3 is a side elevation view of the transfer means illustrating a billet in successive positions therealong.

Referring to Fig. 1, an extrusion press 10 is illustrated as including a front platen 11, a rear platen 12 rigidly tied to platen 11 by tie rods such as 13, a container 14 having limited longitudinal movement relative to the platens, a die carrier 15 movable into and out of front platen 11, and a ram assembly 16 having a ram 17 projectable into container 14. A mandrel 18 is movably mounted coaxially within ram 17.

As described in the copending application of Sidley O. Evans, Serial No. 328,688, filed Dec. 30, 1952, now Patent No. 2,739,799 issued March 27, 1956, billets intended for the extrusion of tubular products are preferably initially heated to a piercing temperature and then pierced to have an inner diameter somewhat larger than that of the extruded tubular products. The initial heating means, the piercing press, and associated conveyors and handling devices have not been shown in detail as they form no part of the present invention.

The pierced billets are then heated to a high temperature, such as 2300° F. in the case of steel, in a preferably rotary heating means 20. The billets are charged into heating means 20 and extracted therefrom by a suitable billet handling device 21. This device deposits the heated billets onto a transfer means 30 which transfers the billets into alignment with passage 24 of container 14 and ejects them into this passage.

Mandrel 18 is first extended through the billet passage and through a die 35 mounted on the rear face of carrier 15 and held thereby against the exit end of container passage 24, carrier 15 being locked into forward platen 11 and thus held against movement relative to the two platens 11 and 12. Ram 17 is then projected into passage 24 to engage the billet and force it, under high pressure, to flow through die 35 around mandrel 18, thus forming a tubular extrusion. Mandrel 18 is withdrawn into ram 17 at the end of the extrusion stroke, and ram 17 and mandrel 18 are then conjointly withdrawn and container 14 moved rearwardly a short distance away from front platen 11. This pulls the extrusion backwardly a short distance through die 35, leaving a short section of the extrusion exposed between container 14 and die 35. This short section is then severed, as by a saw cut, and container 14 is moved forwardly toward platen 11 so that the part of the extrusion, or discard, fixed to the container acts as a ram to push the remainder of the extrusion through die 35. The extruded element is then withdrawn by runout table and conveyor 26. Container 14 is again withdrawn from platen 11, and ram 17 is then moved into container 14 to eject the severed end, or discard, of the extrusion, this discard falling into a suitable receptacle.

Meanwhile, conveyor 26 moves the extrusion forwardly beneath a saw 27. The latter severs the extrusion into the required handling lengths and the cut sections are moved forwardly against a stop 28. At this point, a pusher 29 moves the sections laterally from conveyor 26 onto skids 31 for storage or further handling.

Before the billet, such as 100, is charged into the passage 24 of container 14, one or more cylindrical plugs of glass fiber are placed in the passage 24 so that loading of the billet thereinto will result in the plugs being interposed between the billet and the rear or upstream face of the die assembly. The die assembly is shown and described more particularly in the copending application of David A. Edgecombe, Serial Number 334,221, filed January 30, 1953 for "Die Charging Arrangement for Metal Working Apparatus," now Patent No. 2,731,123, issued January 17, 1956. Also, and as has been briefly mentioned heretofore, the billet has a layer of glass lubricant applied to its external surface as it moves along transfer means 30 to the extrusion press. This may be effected, for example, by wrapping a mat of glass fiber around the billet as it moves along the surface of transfer means 30, as described in the copending application of David A. Edgecombe, Serial No. 346,010, filed March 31, 1953, now Patent No. 2,738,062, issued March 13, 1956. The external layer of glass lubricant may, of course, be applied to the billet in any other desired manner.

As set forth above, lubricant presently is applied to mandrel 18 and the passage in billet 100 by placing a sleeve or sock of glass fiber on mandrel 18 before it is projected into the billet passage. This necessitates the internal diameter of the billet passage being greater than the outer diameter of the mandrel by the overall thickness of the glass fiber sleeve or sock. In turn, this overall thickness is substantially greater than the average thickness of the glass film resulting from plasticization or melting of the sleeve or sock. The present invention is directed to the novel method of applying the glass film to the internal surface of the billet before the latter is charged into the extrusion press. Thereby, the billet inner diameter may be reduced so that the clearance between the billet passage and mandrel is only slightly greater than the thickness of the lubricant layer.

Referring to Figs. 2 and 3, the transfer means 30 is provided, adjacent its end remote from the extrusion press, with a sloping surface or ramp 45 leading into a substantially level platform 40. Billet 100 is delivered from heating means 20, by a billet handling device 21 which may be of the type shown and described in the copending application of Sidley O. Evans, Serial No. 328,688, filed December 30, 1952 for "Charge-Discharge Mechanism for Billet Heating Means," now Patent No. 2,739,799, issued March 27, 1956. As described more particularly in such Evans patent, device 21 is a drum shaped elevator carrying on its periphery a trough arranged to receive a metal "basket" in which is a highly heated billet.

In the unloading position of means 21, this trough is aligned with a trough 50 formed in the upper surface of a table 51 pivotal on trunnions 52 on a shaft extending longitudinally of transfer means 30. Trough 50 may thus be swung up into alignment with the trough on means 21 to receive a billet, and then lowered to hold the billet axis parallel with the surface of transfer means 30.

Extending from the pivoted end of platform 51 is a shock absorber means 56 having a plunger 57 extending into trough 50 in substantial central alignment therewith. As the billet is ejected into trough 50, the plunger 57 acts as a cushioning means for the billet.

By reference to Fig. 2, it will be noted that trough 50 is formed with transverse slots 58. As the trough reaches its horizontal position, fingers 61, secured to a transverse shaft 62, enter slots 58 to lie slightly beneath the billet supporting surface of the trough 50. A crank arm 63, secured to shaft 62, is connected to a piston rod 64 of a pressure fluid actuator 65 pivotally connected at 66 to the framework of means 30. With the trough in the horizontal position, actuator 65 can be operated to cause fingers 61 to be swung counter-clockwise moving billet 100 out of the trough to roll down the ramp 45.

In accordance with the invention, solid glass, in the form of a wad of glass fiber, for example, is placed in the axial passage of the heated billet while the latter is in trough 50. The amount of solid glass so applied is selected in accordance with the billet temperature, composition, length, and inner diameter to provide a lubricant film, on the surface of the axial passage, having the required depth for effective lubrication of mandrel 18 and the billet passage.

Actuator 65 is then energized to cause fingers 61 to swing counter-clockwise to eject the billet from trough 50 to roll down ramp 45 and over the surface of platform 40. The solid glass placed in the billet passage is melted by contact with the hot surface of the passage. As the billet rolls over transfer means 30, the glass is tumbled so that additional glass is brought into contact with the hot metal of the billet and melted. As a result, a uniform depth layer of glass is formed over the surface of the billet passage, this layer being indicated at 60.

As the billet rolls over transfer means 30, it has a layer of glass adhered to its outer surface in any desired manner. At the end of platform 40 nearest the extrusion press, the billet rolls into the container charge device or billet ejector 75. Referring to Figs. 2 and 3, this ejector comprises a V-shaped trough having a slot 73 along its apex. The outer wall of this trough has secured therewith a guide 74 having a laterally opening key-shaped slot 76 receiving a correspondingly shaped rib 77 formed on an ejector bar 78. Ejector bar 78 is thus guided to move along slot 73.

On its surface opposite to rib 77, bar 78 has projecting therefrom an ear 79 connected by a link 87 to one end of a crank 88 pivoted on an axis 89 to swing parallel to the surface of platform 40. The other end of crank 88 is connected to the piston 91 of a pressure fluid actuator 90 pivoted to a cross brace 42 of the transfer means framework. Actuator 90 is operated, when device 75 is aligned with container passage 24, to swing crank 88 to move bar 78 along slot 73 in device 75 to charge the billet into the container passage.

While device 75 is shown fixed to platform 40 for illustrative purposes, in actual practice it may be mounted on the free end of a pivoted section of transfer means 30 so as to be swingable out of the path of movement of the extrusion press parts. The details of any such construction form no part of the present invention. Also, the trough 50 may be made movable longitudinally relative to transfer means 30 between the illustrated position and a receiving and tilted position adjacent device 21.

While a specific embodiment of the invention has been shown and described in detail to illustrate the application of the invention principles, it will be understood that the invention may be embodied otherwise without departing from such principles.

What is claimed is:

1. A method of extruding hollow metal billets comprising heating the billet to an extrusion temperature and rolling the heated billet along a path to the extrusion press, depositing a quantity of glass having a relatively wide range of melting temperatures below but approaching the temperature to which the billet is heated, along the passage of the heated billet, whereby rotation of the billet melts and distributes the glass throughout the surface of the passage to coat substantially the entire peripheral surface of the passage in the hot billet with an adhering viscous layer of glass, charging the coated billet into the container, inserting the mandrel into the billet passage, and while the coating remains in a viscous condition extruding the billet.

2. A method of extruding hollow metal billets comprising heating the billet to an extrusion temperature and rolling the heated billet along a path to the extrusion press, at one zone along the path depositing a quantity of glass, having a relatively wide range of melting temperatures below but approaching the temperature to which the billet is heated, along the passage of the heated billet, at another zone along the path rolling the billet over a surface covered with a layer of particle form glass of similar melting properties, whereby rotation of the billet melts and distributes the glass throughout the surface of the passage and external peripheral surface of the billet to coat substantially the entire peripheral surface of the passage in the hot billet and substantially the entire external peripheral surface of the billet with an adhering viscous layer of glass, charging the coated billet into the container, inserting the mandrel into the billet passage, and while the coating remains in a viscous condition extruding the billet.

References Cited in the file of this patent

UNITED STATES PATENTS

| | | |
|---|---|---|
| 862,285 | Schmidt | Aug. 6, 1907 |
| 1,227,618 | Hodgson | May 29, 1917 |
| 1,718,039 | Draper | June 18, 1929 |
| 2,430,083 | Sherman | Nov. 4, 1947 |
| 2,538,917 | Sejournet et al. | Jan. 23, 1951 |
| 2,630,220 | Sejournet | Mar. 3, 1953 |
| 2,706,850 | Sejournet et al. | Apr. 26, 1955 |
| 2,738,062 | Edgecombe | Mar. 13, 1956 |
| 2,803,215 | Edgecombe et al. | Aug. 20, 1957 |
| 2,810,478 | Sejournet et al. | Oct. 22, 1957 |

FOREIGN PATENTS

| | | |
|---|---|---|
| 11,439 | Great Britain | A.D. 1912 |
| 699,120 | Great Britain | Oct. 28, 1953 |
| 1,000,770 | Germany | Jan. 17, 1957 |
| 1,126,954 | France | Oct. 6, 1956 |

OTHER REFERENCES

"Engineering Materials Handbook," Charles L. Mantell, 1st Ed., McGraw-Hill Book Co., Inc., c1958, p. 2–44.

"Hot Extruded Cold Drawn Sections," pamphlet from Jones & Laughlin Steel Corp., Pittsburgh, Pa., p. 9.